(12) United States Patent
Draper

(10) Patent No.: US 8,453,461 B2
(45) Date of Patent: Jun. 4, 2013

(54) POWER PLANT AND METHOD OF OPERATION

(75) Inventor: Samuel David Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/217,550

(22) Filed: Aug. 25, 2011

(65) Prior Publication Data

US 2012/0119512 A1  May 17, 2012

(51) Int. Cl.
*F02C 9/00* (2006.01)
*F02C 7/08* (2006.01)

(52) U.S. Cl.
USPC ............................................ 60/773; 60/39.52

(58) Field of Classification Search
USPC ......................................... 60/793, 773, 39.52
See application file for complete search history.

(56) References Cited

U.S. PATENT DOCUMENTS

| | | | |
|---|---|---|---|
| 2,621,475 A | 12/1952 | Loy | |
| 2,646,663 A | 7/1953 | Sedille | |
| 3,685,287 A | 8/1972 | Dooley | |
| 3,771,969 A | * 11/1973 | Scheitlin | 422/171 |
| 3,866,411 A | 2/1975 | Marion et al. | |
| 3,875,380 A | * 4/1975 | Rankin | 700/69 |
| 3,949,548 A | 4/1976 | Lockwood, Jr. | |
| 4,267,692 A | 5/1981 | Earnest | |
| 4,271,664 A | 6/1981 | Earnest | |
| 4,313,300 A | 2/1982 | Wilkes et al. | |
| 4,330,038 A | 5/1982 | Soukup et al. | |
| 4,434,613 A | 3/1984 | Stahl | |
| 4,492,085 A | 1/1985 | Stahl et al. | |
| 4,528,811 A | 7/1985 | Stahl | |
| 4,533,314 A | 8/1985 | Herberling | |
| 4,561,245 A | 12/1985 | Ball | |
| 4,566,267 A | 1/1986 | Muller et al. | |
| 5,165,606 A | 11/1992 | Pelet | |

(Continued)

FOREIGN PATENT DOCUMENTS

| EP | 1731833 A1 | 12/2006 |
|---|---|---|
| EP | 2078827 A1 | 7/2009 |
| EP | 2206959 A2 | 7/2010 |

OTHER PUBLICATIONS

Bandar Duraya Al-Anazi, "Enhanced Oil Recovery Techniques and Nitrogen Injection," CSEG Recorder, Oct. 2007, pp. 28-33.

(Continued)

*Primary Examiner* — Gerald Sung
(74) *Attorney, Agent, or Firm* — Sutherland Asbill & Brennan LLP

(57) ABSTRACT

A main air compressor delivers a compressed ambient gas flow with a compressed ambient gas flow rate to a turbine combustor. A fuel stream with a flow rate is delivered to the turbine combustor and mixed with the compressed ambient gas flow and an exhaust gas flow and burned with substantially stoichiometric combustion to form the exhaust gas flow and drive a turbine, thus operating the power plant at a first load. A portion of the exhaust gas flow is recirculated from the turbine to the turbine compressor and a portion is delivered to an exhaust path. The fuel stream flow rate and the compressed ambient gas flow rate are reduced, and substantially stoichiometric combustion is maintained and the power plant is operated at a second load. The fuel stream flow rate is further reduced and lean combustion is achieved and the power plant is operated at a third load.

18 Claims, 5 Drawing Sheets

U.S. PATENT DOCUMENTS

| | | | |
|---|---|---|---|
| 5,341,636 A * | 8/1994 | Paul | 60/773 |
| 5,361,576 A | 11/1994 | Muller | |
| 5,400,587 A | 3/1995 | Keler et al. | |
| 5,426,932 A | 6/1995 | Morihara et al. | |
| 5,557,919 A | 9/1996 | Althaus | |
| 5,564,896 A | 10/1996 | Beeck et al. | |
| 5,584,182 A | 12/1996 | Althaus et al. | |
| 5,595,059 A | 1/1997 | Huber et al. | |
| 5,674,066 A | 10/1997 | Hausermann et al. | |
| 5,724,805 A | 3/1998 | Golomb et al. | |
| 5,794,431 A | 8/1998 | Utamura et al. | |
| 5,809,768 A | 9/1998 | Uematsu et al. | |
| 5,822,992 A * | 10/1998 | Dean | 60/737 |
| 6,050,082 A | 4/2000 | Leonard et al. | |
| 6,082,093 A | 7/2000 | Greenwood et al. | |
| 6,105,362 A | 8/2000 | Ohtomo | |
| 6,202,400 B1 | 3/2001 | Utamura et al. | |
| 6,256,976 B1 | 7/2001 | Kataoka et al. | |
| 6,269,624 B1 | 8/2001 | Frutschi et al. | |
| 6,289,666 B1 | 9/2001 | Ginter | |
| 6,338,240 B1 | 1/2002 | Endo et al. | |
| 6,363,709 B2 | 4/2002 | Kataoka et al. | |
| 6,430,915 B1 | 8/2002 | Wiant et al. | |
| 6,622,470 B2 | 9/2003 | Viteri et al. | |
| 6,637,183 B2 | 10/2003 | Viteri et al. | |
| 6,848,249 B2 | 2/2005 | Coleman et al. | |
| 6,851,266 B2 | 2/2005 | Liebig | |
| 6,868,677 B2 | 3/2005 | Viteri et al. | |
| 6,910,335 B2 | 6/2005 | Viteri et al. | |
| 7,007,487 B2 | 3/2006 | Belokon | |
| 7,032,388 B2 | 4/2006 | Healy | |
| 7,089,743 B2 | 8/2006 | Frutschi et al. | |
| 7,127,898 B2 | 10/2006 | Healy | |
| 7,383,686 B2 | 6/2008 | Aycock et al. | |
| 7,490,472 B2 | 2/2009 | Lynghjem et al. | |
| 7,503,178 B2 | 3/2009 | Bücker | |
| 7,516,609 B2 | 4/2009 | Agnew | |
| 7,726,114 B2 | 6/2010 | Evulet | |
| 7,739,864 B2 | 6/2010 | Finkenrath et al. | |
| 7,895,822 B2 | 3/2011 | Hoffmann et al. | |
| 2003/0051481 A1 | 3/2003 | Priestley et al. | |
| 2004/0011057 A1 | 1/2004 | Huber | |
| 2004/0134194 A1 | 7/2004 | Roby et al. | |
| 2004/0200205 A1 * | 10/2004 | Frutschi et al. | 60/39.52 |
| 2005/0028529 A1 | 2/2005 | Bartlett et al. | |
| 2005/0076645 A1 * | 4/2005 | Frutschi et al. | 60/772 |
| 2005/0150229 A1 | 7/2005 | Baer et al. | |
| 2007/0006592 A1 | 1/2007 | Balan et al. | |
| 2007/0034171 A1 | 2/2007 | Griffin et al. | |
| 2007/0068167 A1 | 3/2007 | Patel et al. | |
| 2007/0125063 A1 | 6/2007 | Evulat | |
| 2007/0125064 A1 | 6/2007 | Sonoda | |
| 2007/0125091 A1 | 6/2007 | Roby et al. | |
| 2007/0220896 A1 | 9/2007 | Varatharajan et al. | |
| 2008/0010967 A1 | 1/2008 | Griffin et al. | |
| 2008/0104938 A1 | 5/2008 | Finkenrath et al. | |
| 2008/0104939 A1 | 5/2008 | Hoffmann et al. | |
| 2008/0120960 A1 | 5/2008 | Agnew | |
| 2008/0309087 A1 | 12/2008 | Evulet et al. | |
| 2009/0199566 A1 | 8/2009 | Lebas et al. | |
| 2009/0218821 A1 | 9/2009 | Elkady et al. | |
| 2009/0280003 A1 | 11/2009 | Schriner et al. | |
| 2009/0284013 A1 | 11/2009 | Anand et al. | |
| 2009/0301054 A1 | 12/2009 | Simpson et al. | |
| 2010/0018218 A1 | 1/2010 | Riley et al. | |
| 2010/0115960 A1 | 5/2010 | Brautsch et al. | |
| 2010/0126181 A1 | 5/2010 | Ranasinghe et al. | |
| 2010/0170218 A1 | 7/2010 | Eluripati et al. | |
| 2010/0180565 A1 | 7/2010 | Draper | |
| 2011/0067408 A1 | 3/2011 | Maly | |
| 2011/0138766 A1 | 6/2011 | ElKady et al. | |
| 2011/0289898 A1 | 12/2011 | Hellat et al. | |

OTHER PUBLICATIONS

Supplemental Disclosure Under 37 C.F.R. § 1.56 dated May 1, 2012 for U.S. Appl. No. 13/217,550.

* cited by examiner

POWER PLANT AND METHOD OF OPERATION

BACKGROUND OF THE INVENTION

The subject matter of the present disclosure relates generally to the field of electric power plants, and more particularly to methods of operating stoichiometric exhaust gas recirculation turbine systems. Various types of gas turbine systems are known and in use for electricity generation in power plants. Typically, the gas turbine systems include a turbine compressor for compressing an air flow and a turbine combustor that combines the compressed air with a fuel and ignites the mixture to generate an exhaust gas. The exhaust gas may then be expanded through a turbine, thereby causing the turbine to rotate, which in turn may be connected to a turbine generator via a turbine shaft, for power generation. Gas turbines have traditionally used excess air within the combustion process to control turbine temperatures and manage undesirable emissions. This often results in an exhaust stream with large amounts of excess oxygen.

Accordingly, there exists a need for a power plant arrangement that uses a gas turbine system that may operate without an exhaust stream with large amounts of excess oxygen. Furthermore, it would be desirable for the power plant arrangement to provide for the option to further reduce emissions through treatment of exhaust gases and/or to recover streams of carbon dioxide, nitrogen, and water.

BRIEF DESCRIPTION OF THE INVENTION

In one aspect, a method for reducing electrical production from a power plant is provided. Ambient air is compressed into a compressed ambient gas flow with at least one main air compressor. At least a first portion of the compressed ambient gas flow is delivered, with a first compressed ambient gas flow rate, to a turbine combustor that is fluidly connected to the at least one main air compressor. A fuel stream, having a first fuel stream flow rate, is delivered to the turbine combustor for mixing with the at least a first portion of the compressed ambient gas flow and with at least a first portion of an exhaust gas flow to form a combustible mixture. The combustible mixture is burned with substantially stoichiometric combustion in the turbine combustor, forming the exhaust gas flow that drives a turbine connected to a turbine compressor via a turbine shaft and operating the power plant at a first load. At least a first portion of the exhaust gas flow is recirculated from the turbine to the turbine compressor using a recirculation loop. At least a second portion of the exhaust gas flow is delivered to an exhaust path. The fuel stream flow rate is reduced to a second fuel stream flow rate that is less than the first fuel stream flow rate. The first compressed ambient gas flow rate is also reduced to a second compressed ambient gas flow rate that is less than the first compressed ambient gas flow rate, wherein substantially stoichiometric combustion is maintained and the power plant is operated at a second load that is lower than the first load. The fuel stream rate is further reduced to a third fuel stream flow rate that is less than the second fuel stream flow rate, wherein lean combustion is achieved and the power plant is operated at a third load that is lower than the second load.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein.

DETAILED DESCRIPTION OF THE INVENTION

Figure 1:
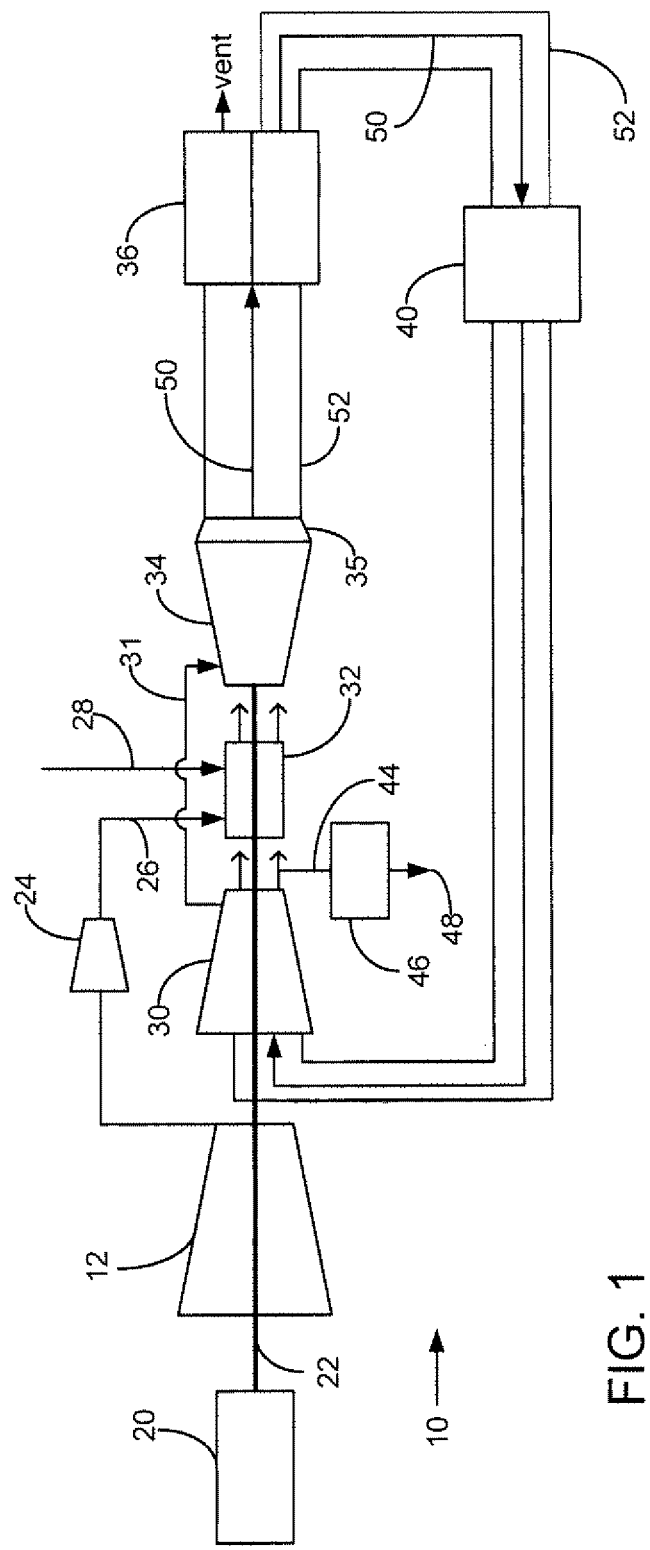
FIG. 1 is a diagrammatical illustration of an exemplary power plant arrangement 10 in accordance with an embodiment of the present invention.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Recent requirements in the power generation industry have necessitated the development of a gas turbine arrangement that may be configured to consume nearly all of the oxygen in the air working fluid to produce a substantially oxygen-free exhaust stream. Such an exhaust stream may be more easily suited to emissions reductions using $NO_x$ catalysts. Additionally, such an exhaust stream may be better suited to post combustion carbon capture solutions due to the low oxygen concentrations. Furthermore, an essentially oxygen-free exhaust stream may be more easily suited to enhanced oil recovery applications.

A substantially oxygen-free exhaust stream from a gas turbine may be accomplished by stoichiometric burning in the combustion system. That is, the oxygen-containing fresh air supply may be matched to the fuel flow such that the combustion process operates substantially stoichiometrically.

A stoichiometric combustion reaction of methane and oxygen is illustrated below:

Stoichiometric combustion may result in gas temperatures much too high for the materials and cooling technology employed in gas turbine engines. In order to reduce those high temperatures, a portion of the gas turbine exhaust products may be recirculated back to the combustion system to dilute the combustion temperatures. Ideally, this diluent gas should also be essentially oxygen-free so as to not introduce additional oxygen into the system and thereby reduce the advantages of stoichiometric combustion. The gas turbine application using stoichiometric combustion and recirculated exhaust gas is referred to as Stoichiometric Exhaust Gas Recirculation (SEGR).

The SEGR system may use a supply of high pressure air fed directly into the combustion process to provide the oxygen for combustion. This air may be supplied by an auxiliary compressor. In practice, the ability of an auxiliary compressor to provide air at the pressure and flow rate required by the SEGR gas turbine will not be matched across all operating ranges of load and ambient temperature experienced by the system. The auxiliary compressor may allow the compressor to provide more air at times than is required by the gas turbine. Further, the auxiliary compressor may be designed with the capability to always provide more air than is required by the gas turbine. In some situations, it may be necessary to discharge some of the air compressed by the auxiliary compressor to the atmosphere.

As discussed in detail below, embodiments of the present invention may function to minimize emissions in gas turbine power plant systems by using an SEGR cycle that may enable substantially stoichiometric combustion reactions for power production. The SEGR gas turbine may be configured so as to provide a low oxygen content exhaust. This low oxygen content exhaust may be used with an $NO_x$ reduction catalyst to provide an exhaust stream that may also be free of $NO_x$ contaminants.

As discussed in detail below, an exhaust path 39 containing a series of exhaust catalysts may be used to control emissions down to near zero at reduced loads. In some of the specific embodiments, the present technique comprises using the SEGR cycle to provide low oxygen content streams of carbon dioxide and nitrogen that may be used for enhanced oil recovery applications.

Power Plant Arrangements

Turning now to the drawings and referring first to FIG. 1 an exemplary power plant arrangement 10 is illustrated. The exemplary power plant arrangement 10 includes a main air compressor 12 for compressing ambient air into at least a first portion of a compressed ambient gas flow 26. In some embodiments, the flow of the at least a first portion of the compressed ambient gas flow 26 to the turbine combustor 32 may be regulated by an air injection valve to deliver the at least a first portion of the compressed ambient gas flow 26 with a compressed ambient gas flow rate.

The turbine combustor 32 may be configured to receive the at least a first portion of the compressed ambient gas flow 26 from the main air compressor 12, at least a first portion of an exhaust gas flow 50 from a turbine compressor 30, and a fuel stream 28, to form a combustible mixture and to burn the combustible mixture to generate the exhaust gas flow 50. The fuel stream 28 may be regulated by a gas control valve to deliver a first fuel stream flow rate. In addition, the power plant arrangement 10 may include a turbine 34 located downstream of the turbine combustor 32. The turbine 34 may be configured to expand the exhaust gas to drive an external load such as a turbine generator 20 via a turbine shaft 22 to generate electricity. In the illustrated embodiment, the at least one main air compressor 12 and the turbine compressor 30 may be driven by the power generated by the turbine 34 via the turbine shaft 22. The combustible mixture may be burned with substantially stoichiometric combustion to thereby form the exhaust gas flow 50 and to drive a turbine 34 connected to a turbine compressor 30 via a turbine shaft 22. Under these conditions, the power plant may be operated at a first load.

As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %.

As used herein, the term "first load" represents the highest electrical load or the greatest amount of electrical energy that may be drawn by a turbine generator 20 connected to the power plant. In some embodiments, the first load may be about 100% load.

As illustrated in FIG. 1, in some embodiments, the turbine shaft 22 may be a "cold-end drive" configuration, meaning the turbine shaft 22 may connect to the generator 20 at the compressor end of the turbine assembly. In other embodiments, the turbine shaft 22 may be a "hot-end drive" configuration, meaning the turbine shaft 22 may connect to the generator 20 at the turbine end of the turbine assembly.

As used herein, the term "gas turbine assembly" refers to all listed components of the power plant arrangements except for the main air compressor 12. For power plant arrangements that comprise multiple main air compressors, the term "gas turbine assembly" refers to all listed components of the power plant arrangements except for the multiple main air compressors.

In some embodiments, a turbine output 35 may deliver the exhaust gas flow 50 to a recirculation loop 52 or to an exhaust path 39 or to both. In some embodiments, the exhaust gas flow 50 may be delivered to the recirculation loop 52 and to the exhaust path 39 in a ratio of about 2:1, a ratio of about 3:2, or a ratio of about 1:1. The recirculation loop 52 fluidly connects the turbine 34 to the turbine compressor 30. The exhaust path 39 may be fluidly connected to the turbine 34 and an exhaust vent 38, and may be used to cleanse the exhaust gas using a series of exhaust catalysts prior to venting to the atmosphere.

In some embodiments, the exhaust gas flow 50 may be directed from the turbine 34 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The exhaust gas flow 50 may then be directed back into the recirculation loop 52 to a recirculated gas flow cooler 40. In still other embodiments, the recirculation loop 52 may not contain a heat recovery steam generator 36 and the exhaust gas flow 50 may instead be introduced directly into the recirculated gas flow cooler 40 upon exit from the turbine 34. In some embodiments, the recirculation loop 52 may not comprise the recirculated gas flow cooler 40.

The recirculated gas flow cooler 40 may be incorporated into the recirculation loop 52 anywhere downstream of the turbine 34. The recirculated gas flow cooler 40 may be configured to lower the temperature of the exhaust gas flow 50 to a suitable temperature for downstream delivery into the turbine compressor 30 via the recirculation loop 52. In some embodiments, a suitable temperature may be below about 66° C., below about 49° C., or below about 45° C.

In embodiments, the gas turbine assembly may further comprise a secondary flow path 31 that may deliver at least a portion of the exhaust gas flow 50 from the turbine compressor 30 to the turbine 34 as a secondary flow. The secondary flow may be used to cool and to seal the turbine 34, including but not limited to individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments, the exemplary power plant arrangement 10 may include a gas flow extraction stream 44 for extracting at least a portion of the exhaust gas flow 50 from the gas turbine assembly and delivering the at least a portion of the exhaust gas flow 50 to a gas separation system 46 and to produce an extraction flow 48. In some embodiments, the gas flow extraction stream 44 may be in fluid communication with an output of the turbine compressor 30. In other embodiments, the gas flow extraction stream 44 may be attached at any point of the recirculation loop 52. In some embodiments, the gas separation system 46 may be a carbon capture and sequestration system (CCS).

In some embodiments, a booster compressor 24 may be incorporated downstream of and in fluid connection with the main air compressor 12 and upstream of an in fluid communication with the turbine combustor 32. The booster compressor 24 may further compress the at least a first portion of the compressed ambient gas flow 26 before delivery into the turbine combustor 32.

In still other embodiments, a blower may be fluidly connected to the recirculation loop 52 upstream of or downstream from the recirculated gas flow cooler 40. The turbine blower may be configured to increase the pressure of the exhaust gas flow 50 prior to delivery into the turbine compressor 30 via the recirculation loop 52.

In some embodiments, the main air compressor 12 may further comprise adjustable inlet guide vanes to control the flow of air into the main air compressor 12. In some embodiments, the turbine compressor 30 may further comprise adjustable inlet guide vanes to control the flow of air into the turbine compressor 30.

In embodiments, at least a portion of the exhaust gas flow 50 may be delivered to the exhaust path 39. The at least a portion of the exhaust gas flow 50 may be directed through the exhaust path 39 which is located within the heat recovery steam generator 36.

The series of exhaust catalysts may be located in the exhaust path 39 and may be situated downstream of the turbine 34 and upstream of the exhaust vent 38. The exhaust path 39 may further comprise a first carbon monoxide catalyst 23, an $NO_x$ catalyst 25, an air injection point 27, and a second carbon monoxide catalyst 29. Any suitable commercially-available carbon monoxide catalysts and $NO_x$ catalysts may be used. The exhaust gas flow 50 may be directed through the exhaust path 39 to the first carbon monoxide catalyst 23, to the $NO_x$ catalyst 25, and to the second carbon monoxide catalyst 29 before the "cleansed" exhaust gas flow 50 is vented to the atmosphere via the exhaust vent 38. The air injection point 27 may supply additional oxygen to the second carbon monoxide catalyst 29 so that sufficient oxygen is present in the exhaust gas flow 50 to produce carbon dioxide using the second carbon monoxide catalyst 29. In some embodiments, the air injection point 27 may use air supplied by the main air compressor 12. In other embodiments, the air injection point 27 may use air supplied by another source, including but not limited to a compressed air cylinder. The series of exhaust catalysts may be configured to cleanse the exhaust gas flow 50 as it leaves the turbine 34 and is vented to the atmosphere.

As used herein, the term "cleanse" means that the carbon monoxide and $NO_x$ concentrations in the exhaust gas flow 50 may be reduced relative to the carbon monoxide and $NO_x$ concentrations in the exhaust gas flow 50 subsequent to exit from the turbine 34. In some embodiments, the cleansed exhaust gas flow 50 may have a carbon monoxide content that is less than about 10 ppm, less than about 5 ppm, or less than about 1 ppm. In some embodiments, the cleansed exhaust gas may have an $NO_x$ content that is less than about 10 ppm, less than about 5 ppm, or less than about 1 ppm.

Figure 2:
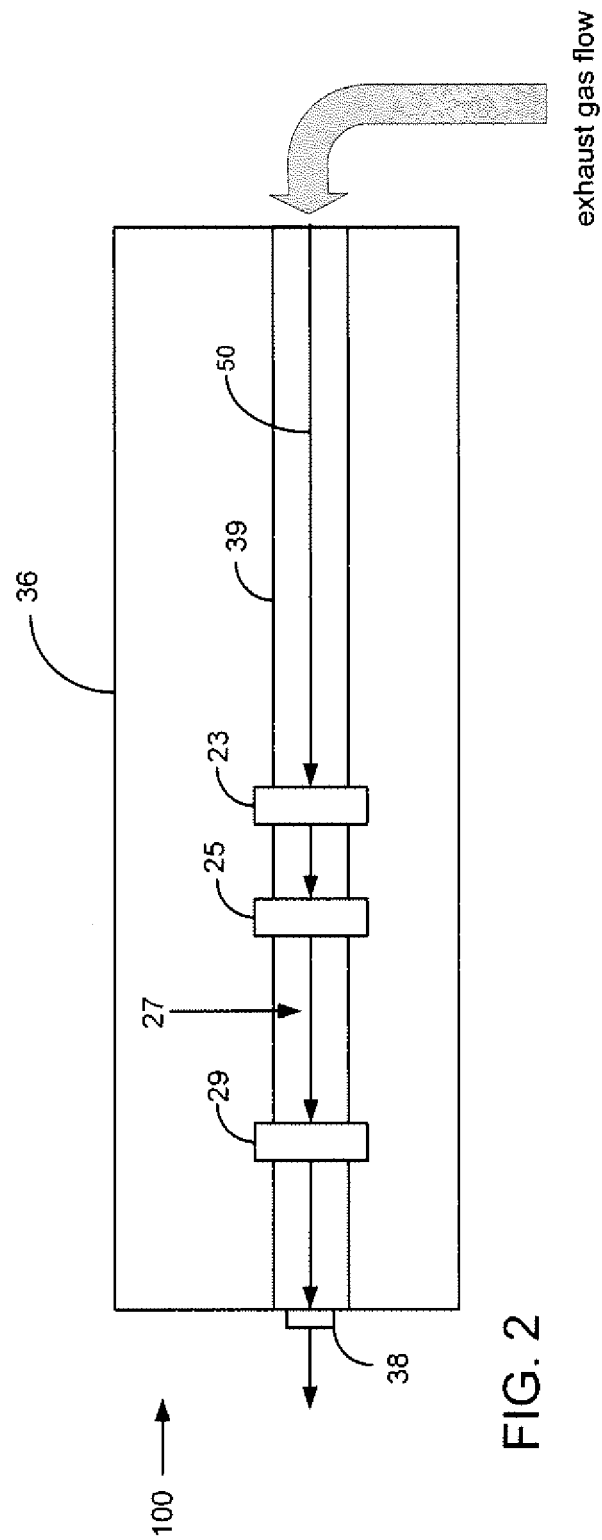
FIG. 2 is a diagrammatical illustration of an exemplary power plant arrangement 100 in accordance with an embodiment of the present invention, wherein a series of exhaust catalysts of an exhaust path 39 is shown in a simplified format.

FIG. 2 is a diagrammatical illustration of an exemplary power plant arrangement 100 that illustrates the exhaust path 39 contained within the heat recovery steam generator 36 shown in FIG. 1. In this embodiment, the exhaust gas flow 50 from the turbine 34 may be delivered to the exhaust path 39 as the at least a portion of the exhaust gas flow 50. The at least a portion of the exhaust gas flow 50 may flow through the first carbon monoxide catalyst 23 and then may flow through the $NO_x$ catalyst 25. Upon exiting the $NO_x$ catalyst 25, the at least a portion of the exhaust gas flow 50 may be mixed with air at the air injection point 27 before the at least a portion of the exhaust gas flow 50 enters the second carbon monoxide catalyst 29. Finally, the cleansed at least a portion of the exhaust gas flow 50 may exit the exhaust path 39 via the exhaust vent 38.

As used herein, the term "slave" is synonymous with the terms secondary, auxiliary, or additional. In the following embodiments, the term "slave" refers to the second of two gas turbine assemblies, but can also mean any additional gas turbine assemblies operated with a main gas turbine assembly such as is the second gas turbine assembly in the following embodiments. Furthermore, the term "master train" is synonymous with a master gas turbine assembly, while the term "slave train" is synonymous with a slave gas turbine assembly.

Figure 3:
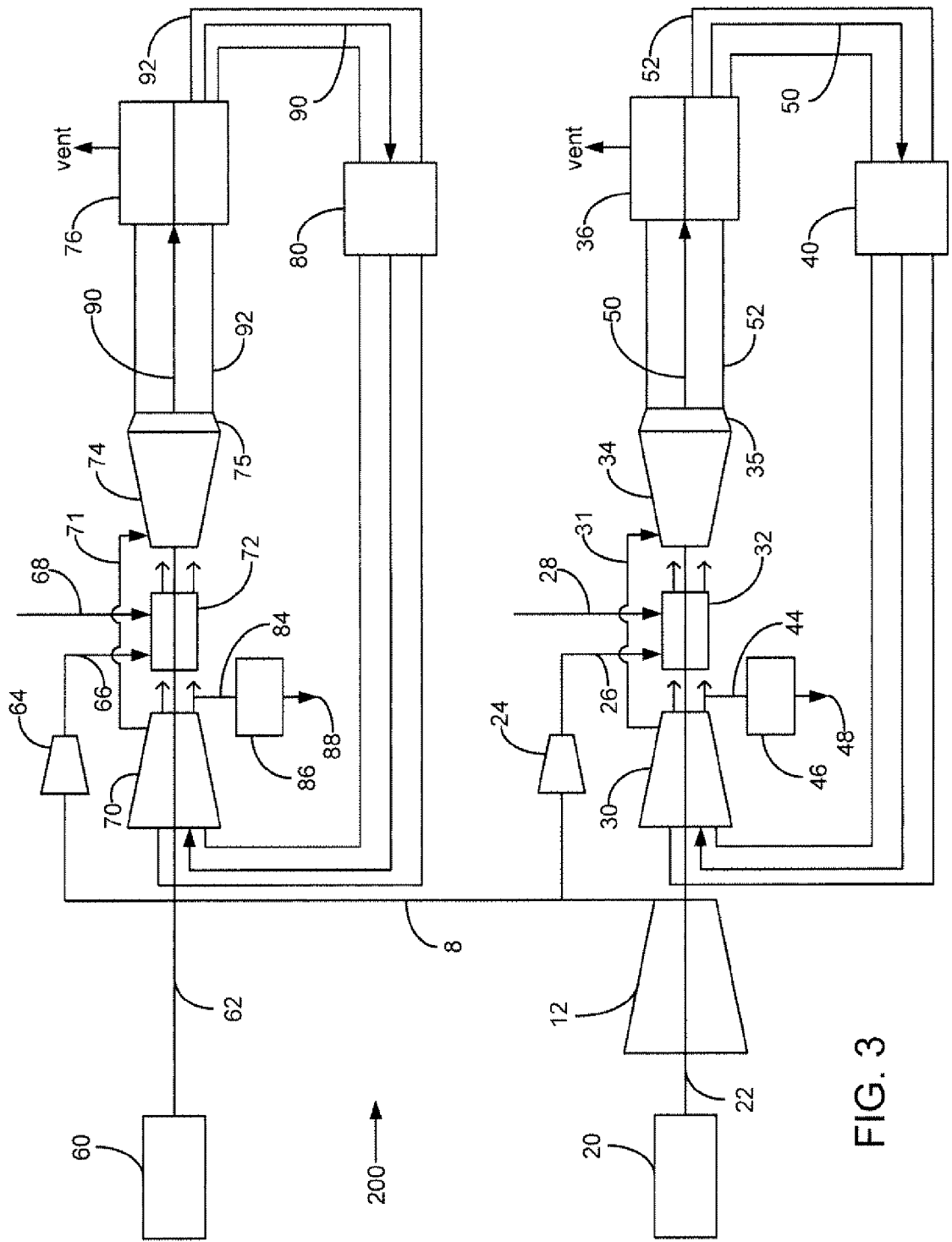
FIG. 3 is a diagrammatical illustration of another exemplary power plant arrangement 200 in accordance with an embodiment of the present invention.

As illustrated in FIG. 3, in some embodiments, the main air compressor 12 may deliver compressed ambient gas to a slave turbine combustor 72 that may be fluidly connected to the main air compressor 12 via an inter-train conduit 8. The flow of the compressed ambient gas through the inter-train conduit 8 may produce at least a second portion of a compressed ambient gas flow 66. In some embodiments, the flow of the at least a second portion of the compressed ambient gas flow 66 to a slave turbine combustor 72 may be regulated by a slave air injection valve to deliver the at least a second portion of the compressed ambient gas flow 66 with a slave compressed ambient gas flow rate.

The slave turbine combustor 72 may be configured to receive the at least a second portion of the compressed ambient gas flow 66 from the main air compressor 12, a slave exhaust gas flow 90 from a slave turbine compressor 70, and a slave fuel stream 68, to form a slave combustible mixture and to burn the slave combustible mixture to generate the slave exhaust gas flow 90. In some embodiments, the slave fuel stream 68 may be regulated by a slave gas control valve to regulate a slave fuel stream flow rate. In addition, the exemplary power plant arrangement 200 may include a slave turbine 74 located downstream of the slave turbine combustor 72. The slave turbine 74 may be configured to expand the slave exhaust gas flow 90 and may drive an external load such as a slave turbine generator 60 via a slave turbine shaft 62 to generate electricity. The slave combustible mixture may be burned with substantially stoichiometric combustion to thereby form the exhaust gas flow 50 and to drive a turbine 34 connected to a turbine compressor 30 via a turbine shaft 22. Under these conditions, the power plant may be operated at a first slave load.

As used herein, the term "substantially stoichiometric combustion" means that the combustion reaction involves substantially stoichiometric burning of fuel and oxygen in the slave combustion system. In other terms, the oxygen content after the slave combustion reaction may be below about 5 vol %, below about 2 vol %, or below about 1 vol %.

As used herein, the term "first slave load" represents the highest electrical load or the greatest amount of electrical energy that may be drawn by a slave turbine generator 60 connected to the power plant. In some embodiments, the first slave load may be about 100% load.

As illustrated in FIG. 3, in some embodiments, the slave turbine shaft 62 may be a "cold-end drive" configuration, meaning the slave turbine shaft 62 may connect to the slave generator 60 at the compressor end of the turbine assembly. In other embodiments, the slave turbine shaft 62 may be a "hot-end drive" configuration, meaning the slave turbine shaft 62 may connect to the slave generator 60 at the turbine end of the turbine assembly.

In embodiments, a slave turbine output 75 may deliver the exhaust gas flow 90 to a slave recirculation loop 92 or to a slave exhaust path 79 or to both. In some embodiments, the slave exhaust gas flow 90 may be delivered to the slave recirculation loop 92 and to the slave exhaust path 79 in a ratio of about 2:1, a ratio of about 3:2, or a ratio of about 1:1. The slave recirculation loop 92 may fluidly connect the slave turbine 74 to the slave turbine compressor 70. The slave exhaust path 79 may be fluidly connected to the slave turbine 74 and a slave exhaust vent 78, and may be used to cleanse the slave exhaust gas flow 90 using a series of slave exhaust catalysts prior to venting to the atmosphere.

In some embodiment, the slave exhaust gas flow 90 may be directed from the slave turbine 74 through the slave recirculation loop 92 to a slave heat recovery steam generator 76 for the generation of steam. A slave steam turbine may further be configured to generate additional electricity using the steam from the slave heat recovery steam generator 76, and the slave steam turbine may be connected to a slave steam generator. The slave exhaust gas flow 90 may then be directed back into the slave recirculation loop 92 to a slave recirculated gas flow cooler 80. In still other embodiments, the slave recirculation loop 92 may not contain a slave heat recovery steam generator 76 and the slave exhaust gas flow 90 may instead be introduced directly into the slave recirculated gas flow cooler 80 upon exit from the slave turbine 74. In other embodiments, the slave recirculation loop 92 may not comprise the slave recirculated gas flow cooler 80.

The slave recirculated gas flow cooler 80 may be incorporated into the slave recirculation loop 92 anywhere downstream from the slave turbine 74. The slave recirculated gas flow cooler 80 may be configured to lower the temperature of the slave exhaust gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, the gas turbine assembly may further comprise a slave secondary flow path 71 that may deliver at least a portion of the slave exhaust gas flow 90 from the slave turbine compressor 70 to the slave turbine 74 as a slave secondary flow. The slave secondary flow may be used to cool and seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, the slave gas turbine assembly of the power plant arrangement 200 may include a slave gas flow extraction stream 84 for extracting at least a portion of the slave exhaust gas flow 90 from the slave gas turbine assembly and delivering the at least a portion of the slave exhaust gas flow 90 to a slave gas separation system 86 to produce a slave extraction flow 88. In some embodiments, the slave recirculated gas flow extraction stream 84 may be in fluid communication with an output of the slave turbine compressor 70. In other embodiments, the slave recirculated gas flow extraction stream 84 may be attached at any point of the slave recirculation loop 92. In some embodiments, the slave gas separation system 86 may be a slave carbon capture and sequestration system (CCS).

In some embodiments, a slave booster compressor 64 may be incorporated downstream of and in fluid connection with the main air compressor 12 and upstream of and in fluid communication with the slave turbine combustor 72. The slave booster compressor 64 may further compress the at least a second portion of the compressed ambient gas flow 66 before delivery into the slave turbine combustor 72.

In still other embodiments, a slave blower may be fluidly connected to the slave recirculation loop 92 upstream of or downstream from the slave recirculated gas flow cooler 80. The slave blower may be configured to increase the pressure of the slave exhaust gas flow 90 prior to delivery into the slave turbine compressor 70 via the slave recirculation loop 92.

In some embodiments, the slave turbine compressor 70 may further comprise adjustable inlet guide vanes to control the flow of air into the slave turbine compressor 70.

Figure 4:
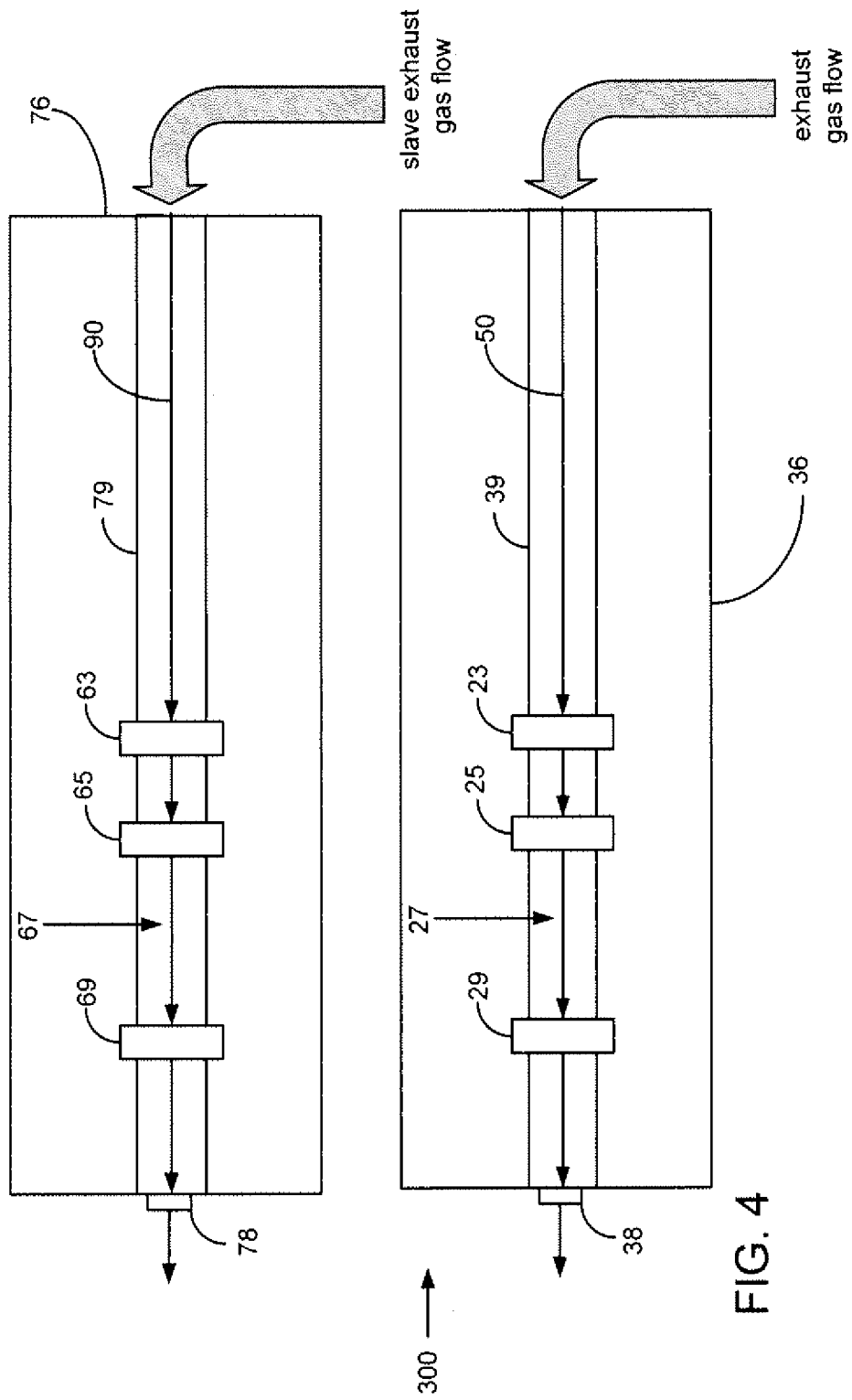
FIG. 4 is a diagrammatical illustration of an exemplary power plant arrangement 300 in accordance with an embodiment of the present invention, wherein two series of exhaust catalysts of an exhaust path 39 and a slave exhaust path 79 are shown in a simplified format.

In some embodiments at least a portion of the slave exhaust gas flow 90 may be delivered to the slave exhaust path 79. As depicted in FIG. 4, the series of slave exhaust catalysts may be located in the slave exhaust path 79 that is contained within the slave heat recovery steam generator 76. The slave exhaust path 79 may further comprise a first slave carbon monoxide catalyst 63, a slave $NO_x$ catalyst 65, a slave air injection point 67, and a second slave carbon monoxide catalyst 69. Any suitable commercially-available carbon monoxide catalysts and $NO_x$ catalysts may be used. The slave exhaust gas flow 90 may be directed through the slave exhaust path 79 to the first slave carbon monoxide catalyst 63, to the slave $NO_x$ catalyst 65, and to the second slave carbon monoxide catalyst 69 before the slave exhaust gas is vented to the atmosphere via the slave exhaust vent 78. The slave air injection point 67 may supply additional oxygen to the slave second carbon monoxide catalyst 69 so that sufficient oxygen may be present in the slave exhaust gas flow 90 to produce carbon dioxide using the slave second carbon monoxide catalyst 69. In some embodiments, the slave air injection point 67 may use air supplied by the main air compressor 12. In other embodiments, the slave air injection point 67 may use air supplied by another source, including but not limited to a compressed air cylinder. The series of slave exhaust catalysts may be configured to cleanse the slave exhaust gas flow 90 as it leaves the slave turbine 74 and is vented to the atmosphere.

In some embodiments, the cleansed slave exhaust gas flow 90 may have a carbon monoxide content that is less than about 10 ppm, less than about 5 ppm, or less than about 1 ppm. In some embodiments, the cleansed slave exhaust gas flow 90 may have an $NO_x$ content that is less than about 10 ppm, less than about 5 ppm, or less than about 1 ppm.

In some embodiments, the power plant arrangement comprises one gas turbine assembly. In other embodiments, the power plant arrangement comprises two or more gas turbine assemblies that are fluidly connected by the inter-train conduit 8. As used herein, the term "inter-train conduit" may refer to a fluid connection between two or more gas turbine assemblies and one or more main air compressors. In still other embodiments, the power plant arrangement comprises three or more gas turbine assemblies and one or more additional main air compressors, wherein the additional main air compressors are in fluid connection with each other and with the gas turbine assemblies. In yet other embodiments, the power plant arrangement is configured for substantially stoichiometric combustion. In still other embodiments, the power plant arrangement is configured for substantially zero emissions power production.

In some embodiments, the fuel stream 28 and/or the slave fuel stream 68 may comprise an organic gas, including but not limited to methane, propane, and/or butane. In still other embodiments, the fuel stream 28 and/or the slave fuel stream 68 may comprise an organic liquid, including but not limited to methanol and/or ethanol. In yet other embodiments, the fuel stream 28 and/or the slave fuel stream 68 may comprise a fuel source obtained from a solid carbonaceous material such as coal.

Method of Reducing Electrical Output

Figure 5:
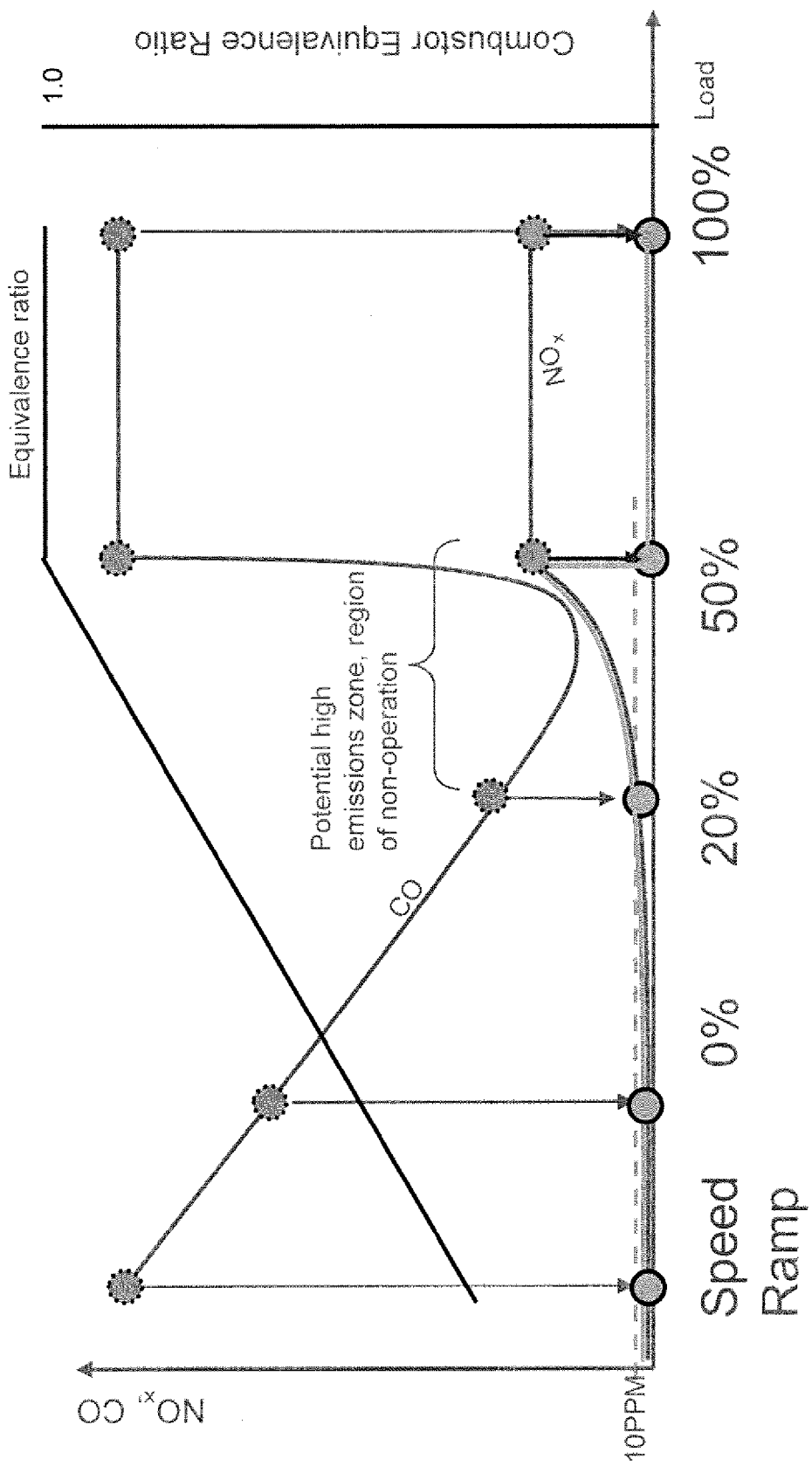
FIG. 5 is a graphical illustration depicting the concentrations of $NO_x$ and CO emissions based on power plant loading. An additional line shown in FIG. 5 depicts a theoretical equivalence ratio of fuel to air and illustrates how this equivalence ratio varies based on power plant loading.

Turning now to FIG. 5, at base load (100% load), the gas turbine of a power plant may operate with a fuel to oxygen equivalence ratio of about 1.0, or at substantially stoichiometric reaction conditions. The fuel and oxygen mixture may be diluted with an amount of a recirculated exhaust gas flow 50 to reduce the flame temperature in the turbine combustor 32. The amount of the recirculated exhaust gas flow 50 that is present in the flame zone of the turbine combustor may be a function of the geometry of the turbine combustor 32 and the pressure balance of the overall system. In some embodiments, the amount of air in the flame zone of the turbine combustor 32 may be controlled by regulating the main air compressor 12 and controlled by a control system. In some embodiments, the amount of fuel in the flame zone of the turbine combustor 32 may be controlled by regulating the fuel stream 28 using a gas control valve.

As the load on the gas turbine is reduced below base load, the amount of fuel and air introduced into the turbine combustor 32 are reduced while the amount of the recirculated exhaust gas flow 50 changes at a slower rate. This may result in an increase in the amount of recirculated exhaust gas flow 50, relative to the amount of oxygen, that is present in the turbine combustor 32. As the relative amount of the recirculated exhaust gas flow 50 increases, the combustion process may become unstable and there may be a point where the combustion process may no longer function stoichiometrically. This may occur at about 50% load, as depicted in FIG. 5.

At loads of about 50%, when the combustion process may no longer be stoichiometric, the amount of fuel may be further reduced while the amount of air may reduced at a slower rate resulting in an excess of oxygen, thus producing a lean but stable combustion reaction. During lean combustion, the amount of CO produced may rapidly decrease while the amount of $NO_x$ may decrease more slowly, and thus the $NO_x$ catalyst may no longer be effective at reducing $NO_x$. This may result in a region of operation, as illustrated in FIG. 5, between about 20% load and about 50% load, where the amount of $NO_x$ produced and emitted may be too high for regulatory requirements and therefore resulting in a region where the power plant is unable to compliantly operate.

As the fuel flow is reduced and the temperatures are reduced during lean combustion, the $NO_x$ formation may further decrease to where the engine may again be in emissions compliance without the $NO_x$ catalyst operating. As depicted in FIG. 5, this region may be at loads below about 20%. At about this level, the formation of CO is high, but the CO oxidation catalysts may still operate and consume the CO, thereby maintaining acceptable levels of emissions.

As the fuel flow is further reduced, the gas turbine of the power plant may reach full speed no load operation, as shown in FIG. 5 (about 0% load). At full speed no load operation, maintaining emissions compliance may be possible due to the effectiveness of the CO catalysts and the low combustion temperatures wherein little $NO_x$ emissions are produced.

Finally, the fuel flow may further be reduced by disengaging the power plant from the power grid and further reducing the gas turbine speed to "standby" operating point.

Referring back to FIG. 1, in operation and in an embodiment, a method for reducing the electrical output of a power plant arrangement 10 is provided, wherein ambient air is compressed using a main air compressor 12 to form a compressed ambient gas flow. At least a first portion of the compressed ambient gas flow 26 may be delivered to a gas turbine assembly. The at least a first portion of the compressed ambient gas flow 26 may be delivered directly to a turbine combustor 32 having a first compressed ambient gas flow rate. The at least a first portion of the compressed ambient gas flow 26 may then be mixed with a fuel stream 28, having a fuel stream flow rate, and at least a first portion of an exhaust gas flow 50 to form a combustible mixture. The combustible mixture may be burned in the turbine combustor 32 to produce the exhaust gas flow 50. The slave combustible mixture may be burned with substantially stoichiometric combustion to thereby form the exhaust gas flow 50 and to drive a turbine 34 connected to a turbine compressor 30 via a turbine shaft 22. Under these conditions, the power plant may be operated at a first slave load.

As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %.

As used herein, the term "first load" represents the highest electrical load or the greatest amount of electrical energy that may be drawn by a turbine generator 20 connected to the power plant. In some embodiments, the first load may be about 100% load.

In this embodiment, a turbine 34 may be driven using the exhaust gas flow 50, thereby causing the turbine 34 to rotate. As used herein, the term "driven using the exhaust gas flow" means the exhaust gas flow 50 expands upon exit from the turbine combustor 32 and upon entrance into the turbine 34, thereby causing the turbine 34 to rotate. In this embodiment, rotation of the turbine 34 may cause the turbine shaft 22 and also the turbine compressor 30 to rotate. The turbine shaft 22 may rotate in the turbine generator 20, such that rotation of the turbine shaft 22 may cause the turbine generator 20 to generate electricity. In some embodiments, the turbine compressor 30 may be fluidly connected to the turbine combustor 32.

As illustrated in FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

In some embodiments, a turbine output 35 may deliver at least a first portion of the exhaust gas flow 50 to a recirculation loop 52 and at least a second portion of the exhaust gas flow 50 to an exhaust path 39. In some embodiments, the exhaust gas flow 50 may be delivered to the recirculation loop 52 and to the exhaust path 39 in a ratio of about 2:1, a ratio of about 3:2, or a ratio of about 1:1. The recirculation loop 52 fluidly connects the turbine 34 to the turbine compressor 30. The exhaust path 39 is fluidly connected to the turbine 34 and an exhaust vent 38, and may be used to cleanse the exhaust gas flow 50 as it leaves the turbine 34 using a series of exhaust catalysts prior to venting to the atmosphere.

The fuel stream flow rate into the turbine combustor 32 may then be reduced to a second fuel stream flow rate that is less than the first fuel stream flow rate. Additionally, the compressed ambient gas flow rate into the turbine combustor 32 may also be reduced to a second compressed ambient gas flow rate that is less than the first compressed ambient gas flow rate. Under these conditions, substantially stoichiometric combustion is maintained and the power plant may be operated at a second load that is lower than the first load. In some embodiments, the second load may be about 90% maximum load, about 80% maximum load, about 70% maximum load, about 60% maximum load, or about 50% maximum load.

Subsequently, the fuel stream flow rate into the turbine combustor 32 may then be reduced to a third fuel stream flow rate that is less than the second fuel stream flow rate. Under these conditions, lean combustion is achieved, meaning that there is no longer stoichiometric combustion because there is an excess of air in the combustion chamber relative to the amount of fuel. In some embodiments, the power plant may thus be operated at a third load that is lower than the second load. In some embodiments, the third load may be about below about 50% maximum load, below about 40% maximum load, below about 30% maximum load, or below about 20% maximum load.

In some embodiments, the fuel stream flow rate may further be reduced to a fourth fuel stream flow rate that is lower than the third fuel stream flow rate. Under these conditions, lean combustion is maintained and the power plant is operated at full speed no load. As used herein, the term "no load" means that the power plant is operated at about 0% maximum load. In some embodiments, the power plant may be disconnected from a power grid to achieve no load operation.

In some embodiments, the fuel stream flow rate may further be reduced to a fifth fuel stream flow rate that is lower than the fourth fuel stream flow rate. Under these conditions, lean combustion is maintained and the power plant is operated at a speed that is less than full speed and at no load. In such situations, the power plant is sustained at a suitable temperature such that a rapid return to load operation is possible. As used herein, "a rapid return to load operation" means that the power plant may be accelerated to load operation at a faster rate than a power plant maintained at ambient temperature.

In some embodiments, the gas turbine assembly may further comprise a secondary flow path 31 that delivers at least a third portion of the exhaust gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments, the exhaust gas flow 50 may be cooled to a suitable temperature before delivery to the turbine compressor 30 using the recirculated gas flow cooler 40. The recirculated gas flow cooler 40 may be incorporated into the recirculation loop 52 anywhere downstream from the turbine 34. In some embodiments, a suitable temperature may be below about 66° C., below about 49° C., or below about 45° C.

In some embodiments, the exhaust gas flow 50 may be directed from the turbine combustor 32 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The exhaust gas flow 50 may then be directed back into the recirculation loop 52 to a recirculated gas flow cooler 40. In still other embodiments, the recirculation loop 52 may not contain a heat recovery steam generator 36 and the exhaust gas flow 50 may instead be introduced directly into the recirculated gas flow cooler 40 upon exit from the turbine 34. In some embodiments, the recirculation loop 52 may not comprise the recirculated gas flow cooler 40.

In some embodiments, the power plant arrangement 10 may include a gas flow extraction stream 44 for extracting at least a portion of the exhaust gas flow 50 from the gas turbine assembly and delivering the at least a portion of the exhaust gas flow 50 to a gas separation system 46 and to produce an extraction flow 48. In some embodiments, the gas flow extraction stream 44 may be in fluid communication with an output of the turbine compressor 30. In other embodiments, the gas flow extraction stream 44 may be attached at any point of the recirculation loop 52. In some embodiments, the gas separation system 46 may be a carbon capture and sequestration system (CCS).

In some embodiments, the at least a first portion of the compressed ambient gas flow 26 may be further compressed by a booster compressor 24. The booster compressor 24 may be incorporated downstream of and in fluid connection with the main air compressor 12 and upstream of and in fluid connection with the turbine combustor 32.

In still other embodiments, a blower may be fluidly connected to the recirculation loop 52 downstream from the recirculated gas flow cooler 40. The blower may be configured to increase the pressure of the exhaust gas flow 50 prior to delivery into the turbine compressor 30 via the recirculation loop 52.

In some embodiments, the main air compressor 12 may further comprise adjustable inlet guide vanes to control the flow of air into the main air compressor 12. In some embodiments, the turbine compressor 30 may further comprise adjustable inlet guide vanes to control the flow of air into the turbine compressor 30.

In some embodiments at least a second portion of the exhaust gas flow 50 may be delivered to the exhaust path 39, located within the heat recovery steam generator 36. The series of exhaust catalysts are located in the exhaust path 39 and are situated downstream of the turbine 34 and upstream of the exhaust vent 38. The exhaust path 39 may further comprise a first carbon monoxide catalyst 23, an $NO_x$ catalyst 25, an air injection point 27, and a second carbon monoxide catalyst 29. Any suitable commercially-available carbon monoxide catalysts and NO$_x$ catalysts may be used. The exhaust gas flow 50 is directed through the exhaust path 39 to the first carbon monoxide catalyst 23, to the NO$_x$ catalyst 25, and to the second carbon monoxide catalyst 29 before the exhaust gas flow 50 is vented to the atmosphere via the exhaust vent 38. The air injection point 27 supplies additional oxygen to the second carbon monoxide catalyst 29 so that sufficient oxygen is present in the exhaust gas flow 50 to produce carbon monoxide using the second carbon monoxide catalyst 29. In some embodiments, the air injection point 27 may use air supplied by the main air compressor 12. In other embodiments, the air injection point 27 may use air supplied by another source, including but not limited to a compressed air cylinder. The series of exhaust catalysts are configured to cleanse the exhaust gas flow 50 as it leaves the turbine 34 and is vented to the atmosphere.

In some embodiments, the cleansed exhaust gas flow 50 may have a carbon monoxide content that is less than about 10 ppm, less than about 5 ppm, or less than about 1 ppm. In some embodiments, the cleansed exhaust gas flow 50 may have an NO$_x$ content that is less than about 10 ppm, less than about 5 ppm, or less than about 1 ppm.

As depicted by FIG. 3, a method for reducing the electrical output of a power plant arrangement 200 is provided. The method for reducing the electrical output of master train has been described hereinabove. The method for reducing the electrical output of a slave train is now described, wherein ambient air is compressed using a main air compressor 12 to form a compressed ambient gas flow. At least a second portion of the compressed ambient gas flow 66 may be delivered to a slave train. The at least a second portion of the compressed ambient gas flow 66 may be delivered directly to a slave turbine combustor 72 having a third compressed ambient gas flow rate. The at least a second portion of the compressed ambient gas flow 66 may then be mixed with a slave fuel stream 68, having a slave fuel stream flow rate, and at least a first portion of a slave exhaust gas flow 90 to form a slave combustible mixture. The slave combustible mixture may be burned in the slave turbine combustor 72 to produce the slave exhaust gas flow 90. The slave combustible mixture may be burned with substantially stoichiometric combustion to thereby form the slave exhaust gas flow 90 and to drive a slave turbine 74 connected to a slave turbine compressor 70 via a slave turbine shaft 62. Under these conditions, the slave train may be operated at a first slave load.

As used herein, the term "substantially stoichiometric combustion" means that the slave combustion reaction involves substantially stoichiometric burning of fuel and oxygen in the slave combustion system. In other terms, the oxygen content after the slave combustion reaction may be below about 5 vol %, below about 2 vol %, or below about 1 vol %.

As used herein, the term "first slave load" represents the highest electrical load or the greatest amount of electrical energy that may be drawn from a slave turbine generator 60 connected to the slave train. In some embodiments, the first slave load may be about 100% load.

In this embodiment, a slave turbine 74 may be driven using the slave exhaust gas flow 90, thereby causing the slave turbine 74 to rotate. As used herein, the term "driven using the slave exhaust gas flow" means the slave exhaust gas flow 90 expands upon exit from the slave turbine combustor 72 and upon entrance into the slave turbine 74, thereby causing the slave turbine 74 to rotate. In this embodiment, rotation of the slave turbine 74 may cause the slave turbine shaft 62 and also the slave turbine compressor 70 to rotate. The slave turbine shaft 62 may rotate in the slave turbine generator 60, such that rotation of the slave turbine shaft 62 may cause the slave turbine generator 60 to generate electricity. In this embodiment, the slave turbine compressor 70 may be fluidly connected to the slave turbine combustor 72.

As illustrated in FIG. 3, in some embodiments, the slave turbine shaft 62 may be a "cold-end drive" configuration, meaning the slave turbine shaft 62 may connect to the slave turbine generator 60 at the compressor end of the slave turbine assembly. In other embodiments, the slave turbine shaft 62 may be a "hot-end drive" configuration, meaning the slave turbine shaft 62 may connect to the slave turbine generator 60 at the turbine end of the slave turbine assembly.

In some embodiments, a slave turbine output 75 may deliver at least a first portion of the slave exhaust gas flow 90 to a slave recirculation loop 92 and at least a second portion of the slave exhaust gas flow 90 to a slave exhaust path 79. In some embodiments, the slave exhaust gas flow 90 may be delivered to the slave recirculation loop 92 and to the slave exhaust path 79 in a ratio of about 2:1, a ratio of about 3:2, or a ratio of about 1:1. The slave recirculation loop 92 fluidly connects the slave turbine 74 to the slave turbine compressor 70. The slave exhaust path 79 is fluidly connected to the slave turbine 74 and a slave exhaust vent 78, and may be used to cleanse the slave exhaust gas flow 90 as it leaves the slave turbine 74 using a series of slave exhaust catalysts prior to venting to the atmosphere.

The slave fuel stream flow rate into the slave turbine combustor 72 may then be reduced to a second slave fuel stream flow rate that is less than the first slave fuel stream flow rate. Additionally, the slave compressed ambient gas flow rate into the slave turbine combustor 72 may also be reduced to a fourth compressed ambient gas flow rate that is less than the third compressed ambient gas flow rate. Under these conditions, substantially stoichiometric combustion is maintained and the slave train may be operated at a second slave load that is lower than the first slave load. In some embodiments, the second slave load may be about 90% maximum load, about 80% maximum load, about 70% maximum load, about 60% maximum load, or about 50% maximum load.

Subsequently, the slave fuel stream flow rate into the slave turbine combustor 72 may then be reduced to a third slave fuel stream flow rate that is less than the second slave fuel stream flow rate. Under these conditions, lean combustion is achieved, meaning that there is no longer stoichiometric combustion because there is an excess of air in the slave combustion chamber relative to the amount of fuel. In some embodiments, the slave train may thus be operated at a third slave load that is lower than the second slave load. In some embodiments, the third slave load may be about below about 50% maximum load, below about 40% maximum load, below about 30% maximum load, or below about 20% maximum load.

In some embodiments, the slave fuel stream flow rate may further be reduced to a fourth slave fuel stream flow rate that is lower than the third slave fuel stream flow rate. Under these conditions, lean combustion is maintained and the slave train is operated at full speed no load. As used herein, the term "no load" means that the slave train is operated at about 0% maximum load. In some embodiments, the slave train may be disconnected from a power grid to achieve no load operation.

In some embodiments, the slave fuel stream flow rate may further be reduced to a fifth slave fuel stream flow rate that is lower than the fourth slave fuel stream flow rate. Under these conditions, lean combustion is maintained and the slave train is operated at a speed that is less than full speed and at no load. In such situations, the slave train is sustained at a suitable temperature such that a rapid return to load operation is possible. As used herein, "a rapid return to load operation" means that the slave train may be accelerated to load operation at a faster rate than a slave train maintained at ambient temperature.

In some embodiments, the slave train further comprise a slave secondary flow path 71 that delivers at least a third portion of the slave exhaust gas flow 90 from the slave turbine compressor 70 to the slave turbine 74 as a slave secondary flow. The slave secondary flow may be used to cool and seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, the slave exhaust gas flow 90 may be cooled to a suitable temperature before delivery to the slave turbine compressor 70 using the slave recirculated gas flow cooler 80. The slave recirculated gas flow cooler 80 may be incorporated into the slave recirculation loop 92 anywhere downstream from the slave turbine 74. In some embodiments, a suitable temperature may be below about 66° C., below about 49° C., or below about 45° C.

In some embodiments, the slave exhaust gas flow 90 may be directed from the slave turbine combustor 72 through the slave recirculation loop 92 to a slave heat recovery steam generator 76 for the generation of steam. A slave steam turbine may be configured to generate additional electricity using the steam from the slave heat recovery steam generator 76, and the slave steam turbine may be connected to a slave steam generator. In some embodiments, the slave steam turbine may be arranged to be connected to the slave turbine shaft 62. The slave exhaust gas flow 90 may then be directed back into the slave recirculation loop 92 to a slave recirculated gas flow cooler 80. In still other embodiments, the slave recirculation loop 92 may not contain a slave heat recovery steam generator 76 and the slave exhaust gas flow 90 may instead be introduced directly into the slave recirculated gas flow cooler 80 upon exit from the slave turbine 74. In some embodiments, the slave recirculation loop 92 may not comprise the slave recirculated gas flow cooler 80.

In some embodiments, the power plant arrangement 200 may include a slave gas flow extraction stream 84 for extracting at least a portion of the slave exhaust gas flow 90 from the slave train and delivering the at least a portion of the slave exhaust gas flow 90 to a slave gas separation system 86 to produce a slave extraction flow 88. In some embodiments, the slave gas flow extraction stream 84 may be in fluid communication with an output of the slave turbine compressor 70. In other embodiments, the slave gas flow extraction stream 84 may be attached at any point of the slave recirculation loop 92. In some embodiments, the slave gas separation system 86 may be a carbon capture and sequestration system (CCS).

In some embodiments, the at least a second portion of the compressed ambient gas flow 66 may be further compressed by a slave booster compressor 64. The slave booster compressor 64 may be incorporated downstream of and in fluid connection with the main air compressor 12 and upstream of and in fluid connection with the slave turbine combustor 72.

In still other embodiments, a slave blower may be fluidly connected to the slave recirculation loop 92 upstream of or downstream from the slave recirculated gas flow cooler 80. The slave blower may be configured to increase the pressure of the slave exhaust gas flow 90 prior to delivery into the slave turbine compressor 70 via the slave recirculation loop 92.

In some embodiments, the slave turbine compressor 70 may further comprise adjustable inlet guide vanes to control the flow of air into the slave turbine compressor 7.

In some other embodiments, at least a second portion of the slave exhaust gas flow 90 may be delivered to the slave exhaust path 79, located within the slave heat recovery steam generator 76. The series of slave exhaust catalysts are located in the slave exhaust path 79 and are situated downstream of the slave turbine 74 and upstream of the slave exhaust vent 78. The slave exhaust path 79 further comprises a first slave carbon monoxide catalyst 63, a slave $NO_x$ catalyst 65, a slave air injection point 67, and a second slave carbon monoxide catalyst 69. Any suitable commercially-available carbon monoxide catalysts and $NO_x$ catalysts may be used. The slave exhaust gas flow 90 is directed through the slave exhaust path 79 to the first slave carbon monoxide catalyst 63, to the slave $NO_x$ catalyst 65, and to the second slave carbon monoxide catalyst 69 before the slave exhaust gas flow 90 is vented to the atmosphere via the slave exhaust vent 78. The slave air injection point 67 supplies additional oxygen to the second slave carbon monoxide catalyst 69 so that sufficient oxygen is present in the slave exhaust gas flow 90 to produce carbon monoxide using the second slave carbon monoxide catalyst 69. In some embodiments, the slave air injection point 67 may use air supplied by the main air compressor 12. In other embodiments, the slave air injection point 67 may use air supplied by another source, including but not limited to a compressed air cylinder. The series of slave exhaust catalysts are configured to cleanse the slave exhaust gas flow 90 as it leaves the slave turbine 74 and is vented to the atmosphere.

In some embodiments, the cleansed slave exhaust gas flow 90 may have a carbon monoxide content that is less than about 10 ppm, less than about 5 ppm, or less than about 1 ppm. In some embodiments, the cleansed slave exhaust gas flow 90 may have an $NO_x$ content that is less than about 10 ppm, less than about 5 ppm, or less than about 1 ppm.

As illustrated in FIG. 3, in some embodiments, the slave turbine shaft 62 may be a "cold-end drive" configuration, meaning the slave turbine shaft 62 may connect to the slave turbine generator 60 at the compressor end of the turbine assembly. In other embodiments, the slave turbine shaft 62 may be a "hot-end drive" configuration, meaning the slave turbine shaft 62 may connect to the slave turbine generator 60 at the turbine end of the turbine assembly.

As depicted in FIG. 4, the series of slave exhaust catalysts may be located in the slave exhaust path 79 and may be situated downstream of the slave turbine 74 and upstream of the slave exhaust vent 78. The slave exhaust path may further comprise a first slave carbon monoxide catalyst 63, a slave $NO_x$ catalyst 65, a slave air injection point 67, and a second slave carbon monoxide catalyst 69. Any suitable commercially-available carbon monoxide catalysts and $NO_x$ catalysts may be used. The slave turndown exhaust gas flow 77 may be directed through the slave turndown path 79 to the first slave carbon monoxide catalyst 63, to the slave $NO_x$ catalyst 65, and to the second slave carbon monoxide catalyst 69 before the slave exhaust gas is vented to the atmosphere via the slave exhaust vent 78. The slave air injection point 67 may supply additional oxygen to the slave second carbon monoxide catalyst 69 so that sufficient oxygen is present in the slave exhaust gas flow 90 to produce carbon monoxide using the slave second carbon monoxide catalyst 69. In some embodiments, the slave air injection point 67 may use air supplied by the main air compressor 12. In other embodiments, the slave air injection point 67 may use air supplied by another source, including but not limited to a compressed air cylinder. The series of slave exhaust catalysts may be configured to cleanse the slave exhaust gas flow 90 as it leaves the slave turbine 74 and is vented to the atmosphere.

In some embodiments, the method comprises operating a power plant arrangement that comprises one gas turbine assembly. In other embodiments, the method comprises operating a power plant arrangement that comprises two or more gas turbine assemblies that are fluidly connected by the intertrain conduit 8. In still other embodiments, the method comprises operating a power plant arrangement that comprises three or more gas turbine assemblies and one or more additional main air compressors, wherein the additional main air compressors are in fluid connection with each other and with the gas turbine assemblies. In yet other embodiments, the method comprises operating a power plant arrangement that is configured for substantially stoichiometric combustion. In still other embodiments, the method comprises operating a power plant arrangement that is configured for substantially zero emissions power production.

Other configurations and methods of operation are provided by U.S. Patent Applications including "Power Plant and Method of Operation" to Daniel Snook, Lisa Wichmann, Sam Draper, Noemie Dion Ouellet, and Scott Rittenhouse (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant Start-Up Method" to Daniel Snook, Lisa Wichmann, Sam Draper, Noemie Dion Ouellet, and Scott Rittenhouse (filed Aug. 25, 2011), "Power Plant and Control Method" to Daniel Snook, Lisa Wichmann, Sam Draper, and Noemie Dion Ouellet (filed Aug. 25, 2011), "Power Plant and Method of Operation" to Predrag Popovic (filed Aug. 25, 2011), "Power Plant and Method of Operation" to Sam Draper and Kenneth Kohl (filed Aug. 25, 2011), "Power Plant and Method of Operation" to Sam Draper (filed Aug. 25, 2011), "Power Plant and Method of Use" to Daniel Snook, Lisa Wichmann, Sam Draper, and Noemie Dion Ouellet (filed Aug. 25, 2011), "Power Plant and Method of Operation" to Lisa Wichmann (filed Aug. 25, 2011), and "Power Plant and Control Method" to Karl Dean Minto (filed Aug. 25, 2011), the disclosures of which are incorporated by reference herein.

It should be apparent that the foregoing relates only to the preferred embodiments of the present invention and that numerous changes and modifications may be made herein without departing from the spirit and the scope of the invention as defined by the following claims and equivalents thereof.

I claim:

1. A method for reducing electrical production from a power plant, comprising the steps of:
   compressing ambient air into a compressed ambient gas flow with at least one main air compressor;
   delivering at least a first portion of the compressed ambient gas flow, with a first compressed ambient gas flow rate, to a turbine combustor that is fluidly connected to the at least one main air compressor;
   delivering a fuel stream, having a fuel stream flow rate, to the turbine combustor for mixing with the at least a first portion of the compressed ambient gas flow and with at least a first portion of an exhaust gas flow to form a combustible mixture, wherein the fuel stream flow rate has a first flow rate;
   burning the combustible mixture with substantially stoichiometric combustion in the turbine combustor, thereby forming the exhaust gas flow and driving a turbine connected to a turbine compressor via a turbine shaft and operating the power plant at a first load, wherein the first load is in a range of about 50% to about 100% of a maximum load;
   recirculating at least a first portion of the exhaust gas flow from the turbine to the turbine compressor using a recirculation loop;
   delivering at least a second portion of the exhaust gas flow to an exhaust path;
   reducing the fuel stream flow rate to a second flow rate that is less than the first flow rate and reducing the first compressed ambient gas flow rate to a second compressed ambient gas flow rate that is less than the first compressed ambient gas flow rate, wherein substantially stoichiometric combustion is maintained and the power plant is operated at a second load that is lower than the first load, wherein the second load is in a range of about 50% to about 100% of the maximum load; and
   reducing the fuel stream flow rate to a third flow rate that is less than the second flow rate, wherein non-stoichiometric combustion is achieved and the power plant is operated at a third load that is lower than the second load, wherein the third load is less than about 50% of the maximum load.

2. The method of claim 1, further comprising delivering a secondary flow through a secondary flow path, wherein the secondary flow path delivers at least a third portion of the exhaust gas flow from the turbine compressor to the turbine for cooling and sealing the turbine and thereafter into the recirculation loop.

3. The method of claim 1, further comprising passing the exhaust gas flow through a recirculated gas flow cooler in the recirculation loop that is configured to lower the temperature of the exhaust gas flow to a suitable temperature for delivery to the turbine compressor.

4. The method of claim 1, the exhaust path comprising a first carbon monoxide catalyst, an $NO_x$ catalyst, an air injection port, and a second carbon monoxide catalyst.

5. The method of claim 1, further comprising passing the exhaust gas flow through a heat recovery steam generator to generate steam and additional electricity using a steam turbine and a steam generator.

6. The method of claim 1, further comprising delivering the at least a first portion of the compressed ambient gas flow to a booster compressor, wherein the booster compressor is configured to compress and to deliver the at least a first portion of the compressed ambient gas to flow to the turbine combustor.

7. The method of claim 1, further comprising reducing the fuel stream flow rate to a fourth fuel stream flow rate that is less than the third fuel stream flow rate, wherein non-stoichiometric combustion is maintained and the power plant is operated at no load.

8. The method of claim 7, further comprising disconnecting the power plant from a grid.

9. The method of claim 8, further comprising reducing the fuel stream flow rate to a fifth flow rate that is less than the fourth flow rate, wherein non-stoichiometric combustion is maintained and the power plant is sustained at a suitable temperature for a rapid return to a load operation, wherein the load operation is in a range of up to about 100% of the maximum load.

10. The method of claim 1, further comprising reducing electrical production from a slave power plant, comprising the steps of:
   delivering at least a second portion of the compressed ambient gas flow, with a third compressed ambient gas flow rate, to a slave turbine combustor that is fluidly connected to the at least one main air compressor via an inter-train conduit;

delivering a slave fuel stream, having a slave fuel stream flow rate, to the slave turbine combustor for mixing with the at least a second portion of the compressed ambient gas flow and with at least a first portion of a slave exhaust gas flow to form a slave combustible mixture, wherein the slave fuel stream flow rate has a first slave flow rate;

burning the slave combustible mixture with substantially stoichiometric combustion in the slave turbine combustor, thereby forming the slave exhaust gas flow and driving a slave turbine connected to a slave turbine compressor via a slave turbine shaft and operating the slave power plant at a first slave load, wherein the first slave load is in a range of about 50% to about 100% of a maximum slave load;

recirculating at least a first portion of the slave exhaust gas flow from the slave turbine to the slave turbine compressor using a slave recirculation loop;

delivering at least a second portion of the slave exhaust gas flow to a slave exhaust path;

reducing the slave fuel stream flow rate to a second slave flow rate that is less than the first slave flow rate and reducing the third compressed ambient gas flow rate to a fourth compressed ambient gas flow rate that is less than the third compressed ambient gas flow rate, wherein substantially stoichiometric combustion is maintained and the slave power plant is operated at a second slave load that is lower than the first slave load, wherein the second slave load is in a range of about 50% to about 100% of the maximum slave load; and reducing the slave fuel stream flow rate to a third slave flow rate that is less than the second slave flow rate, wherein non-stoichiometric combustion is achieved and the slave power plant is operated at a third slave load that is lower than the second slave load, wherein the third slave load is less than about 50% of the maximum slave load.

11. The method of claim 10, further comprising delivering a slave secondary flow through a slave secondary flow path, wherein the slave secondary flow path delivers at least a third portion of the slave exhaust gas flow from the slave turbine compressor to the slave turbine for cooling and sealing the slave turbine and thereafter into the slave recirculation loop.

12. The method of claim 10, further comprising passing the slave exhaust gas flow through a slave recirculated gas flow cooler in the slave recirculation loop that is configured to lower the temperature of the slave exhaust gas flow to a suitable temperature for delivery to the slave turbine compressor.

13. The method of claim 10, the slave exhaust path comprising a first slave carbon monoxide catalyst, a slave $NO_x$ catalyst, a slave air injection port, and a second slave carbon monoxide catalyst.

14. The method of claim 10, further comprising passing the slave exhaust gas flow through a slave heat recovery steam generator to generate steam and additional electricity using a slave steam turbine and a slave steam generator.

15. The method of claim 1, further comprising delivering the at least a second portion of the compressed ambient gas flow to a slave booster compressor, wherein the slave booster compressor is configured to compress and to deliver the at least a second portion of the compressed ambient gas to flow to the slave turbine combustor.

16. The method of claim 10, further comprising reducing the slave fuel stream flow rate to a fourth slave fuel stream flow rate that is less than the third slave fuel stream flow rate, wherein non-stoichiometric combustion is maintained and the slave power plant is operated at no load.

17. The method of claim 16, further comprising disconnecting the slave power plant from a grid.

18. The method of claim 17, further comprising reducing the slave fuel stream flow rate to a fifth slave flow rate that is less than the fourth slave flow rate, wherein non-stoichiometric combustion is maintained and the slave power plant is sustained at a suitable temperature for a rapid return to a slave load operation, wherein the slave load operation is in the range of up to about 100% of the maximum slave load.

* * * * *